US006360964B1

(12) United States Patent
Occhiogrosso

(10) Patent No.: US 6,360,964 B1
(45) Date of Patent: Mar. 26, 2002

(54) PRESSURE WASHER

(76) Inventor: Steve Occhiogrosso, 10589 Summertime La., Royal Palm Beach, FL (US) 33421

( * ) Notice: Subject to any disclaimer, the term of this patent is extended or adjusted under 35 U.S.C. 154(b) by 0 days.

(21) Appl. No.: 09/670,523

(22) Filed: Sep. 26, 2000

(51) Int. Cl.$^7$ .............................................. A01G 25/09
(52) U.S. Cl. ........................ 239/172; 239/127; 239/146; 239/310; 239/407; 134/95.3; 137/888; 137/597; 137/893
(58) Field of Search ................................. 239/130, 146, 239/148, 172, 127, 302–308, 310, 398, 407, 124; 134/95.1, 95.3, 172; 137/216, 565.15, 597, 888, 893

(56) References Cited

U.S. PATENT DOCUMENTS 3,227,376 A    1/1966   Rittenhouse
3,317,142 A *  5/1967   Casale ......................... 239/172
3,481,544 A * 12/1969   Jackson ....................... 239/130
3,612,356 A   10/1971   McVey
3,831,849 A    8/1974   Studinger
4,213,796 A *  7/1980   Shaffer .................... 239/172 X
4,821,958 A    4/1989   Shaffer
5,310,113 A *  5/1994   Cowgur .................. 239/127 X

* cited by examiner

Primary Examiner—Steven J. Ganey
(74) Attorney, Agent, or Firm—McHale & Slavin

(57) ABSTRACT

An pressure washer enclosure capable of high pressure spraying with all pumps and chemicals enclosed for the protection of personnel and security of the chemicals. An external curbside control panel allows the operator to control the amount and concentration of the fluid emissions. A sealed plumbing arrangement minimizes chemical storage, handling and exposure. The enclosure has provisions for related cleaning equipment including a ladder rack accessible from the exterior of the housing.

7 Claims, 3 Drawing Sheets

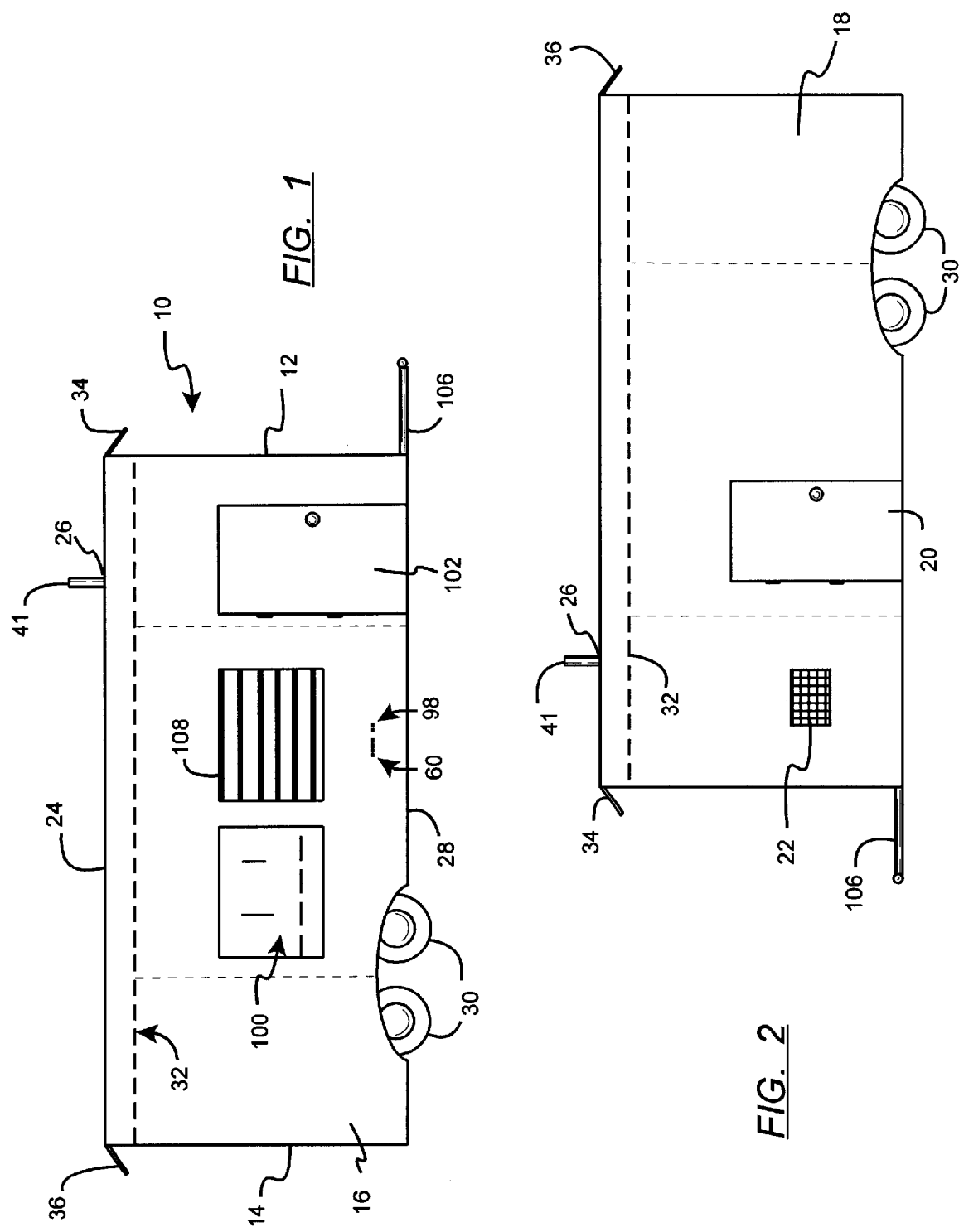

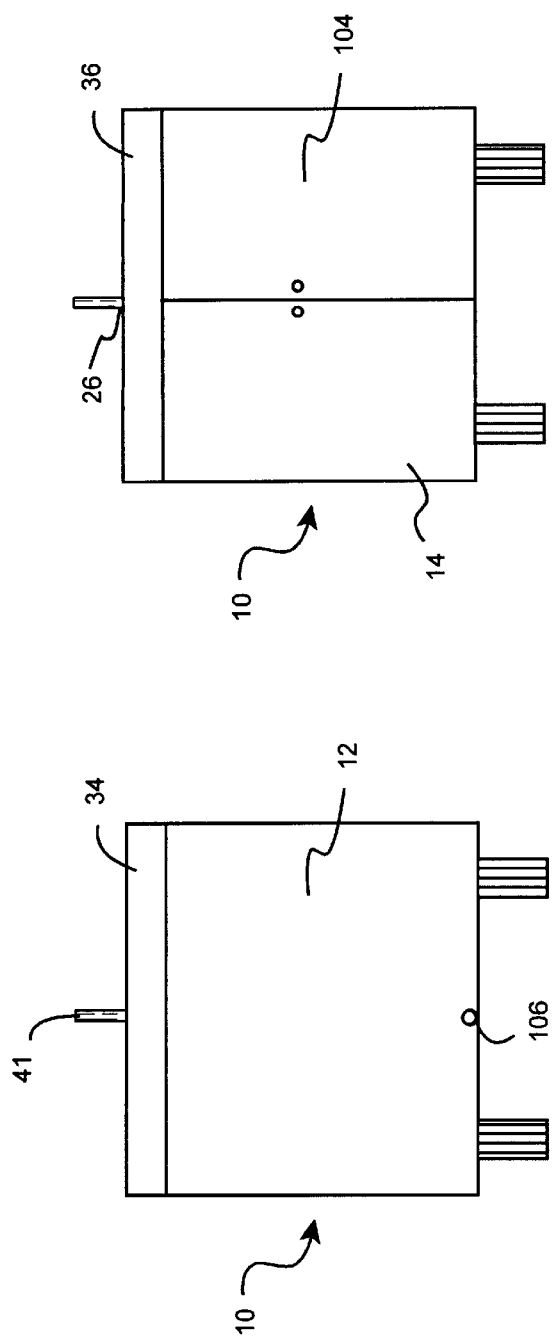
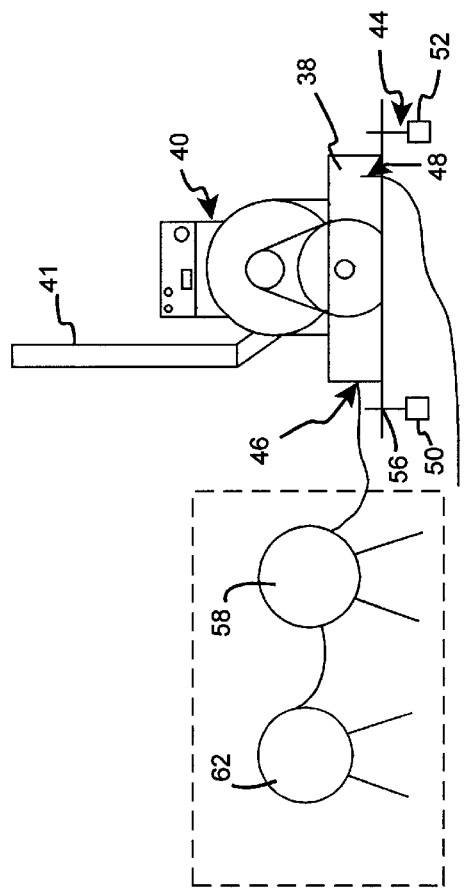

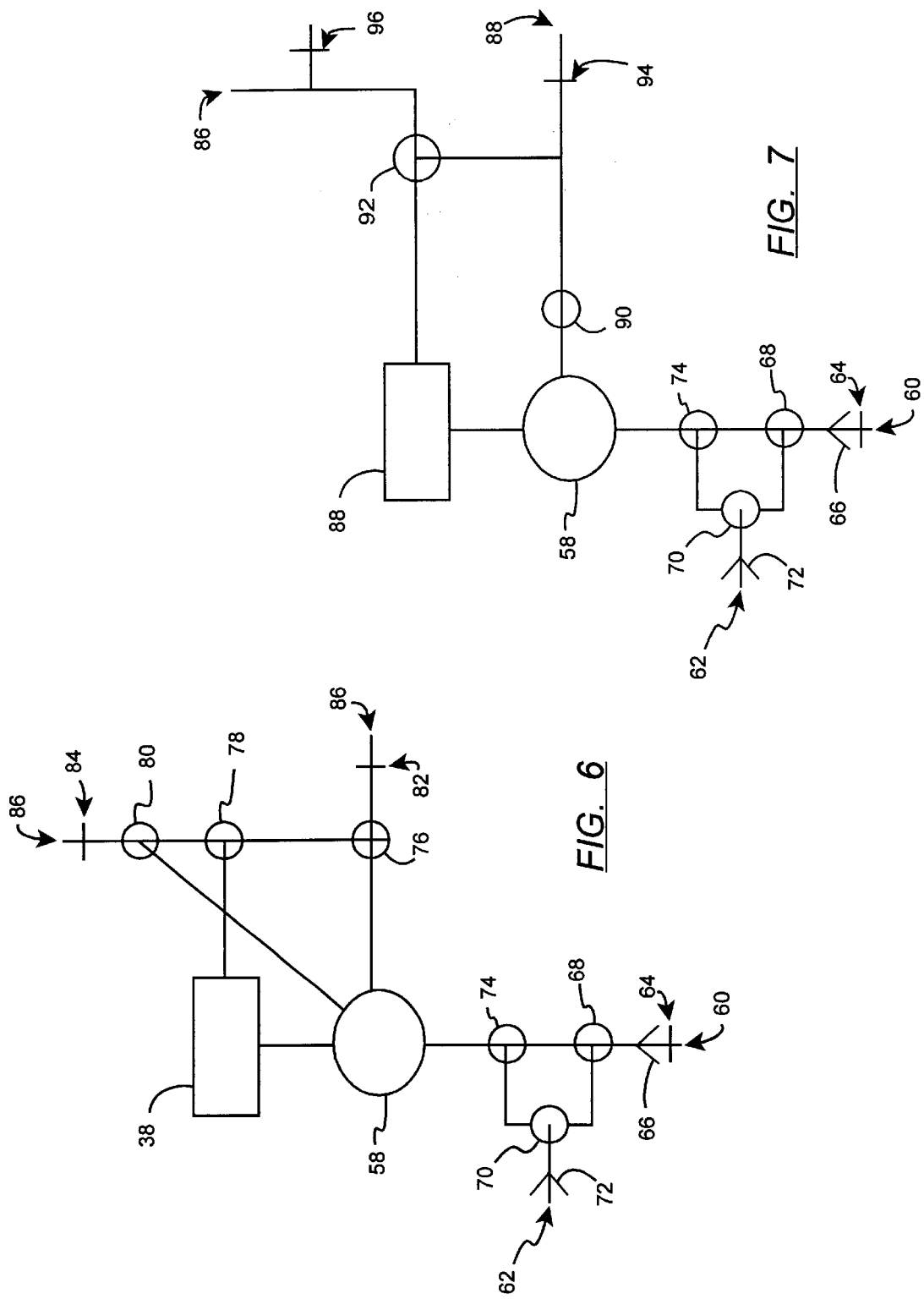

PRESSURE WASHER

FIELD OF INVENTION

This invention relates to pressure washers and, in particular, to a pressure washer apparatus that is mobile with an improvement directed to the handling of chemicals.

BACKGROUND OF THE INVENTION

Methods of cleaning structures have varied greatly over the years. The particular method of cleaning larger structure, such as multi-storied buildings, is often a direct function of the height of the building and its location. One such method is the use of a mobile pressurized water system that can be transported to the building and capable of delivering high pressure water through a flexible hose. The pressurized water loosens the materials and provides a rinse. If the water is fed continuously, the pressure washer allows high speed cleaning on a continuous basis. When a chemical is added to the water, the pressure washer provides a scouring effect capable of cleaning most any surface.

Most conventional pressure washers are not feasible or effectively capable of reaching multi-stored buildings where back pressure causes a loss in operating pressures. One method of addressing this problem is to increase the size and speed of the operating pumps, however, the higher pressures results in control problems and the higher pump pressures can endanger the operator of the system and surrounding personnel. In this manner the concentration of chemicals, as well as the ability to insert and regulate the chemical, becomes a problem. Still another problem with the prior art is storing chemicals and related cleaning materials in a securable enclosure both when the pressure washer is in use and when it is stored.

Mobile pressurized water sprayers are known in the art as disclosed in U.S. Pat. No. 3,227,376 issued to Rittenhouse. The Rittenhouse reference includes a motor enclosed in a dedicated housing but is a spraying device for agricultural applications. As such, Rittenhouse employs jets to force mist into a stream of substantially non-turbulent air. This non-turbulent airflow is created by fan blades that direct ambient air through a specially-vaned, hollow chamber. The fan which creates the necessary airflow is linked to a motor by a pulley system. The Rittenhouse components are not, as a group, enclosed within a housing structure. Instead, they are simply mounted on an open-air trailer platform. This open-air design is critical to the Rittenhouse device: enclosing the Rittenhouse elements would make them inoperable and requires an "open-ended elongated tubular sleeve". Creating a housing around the Rittenhouse elements would not only prevent distribution of the mist created by the sprayer jet nozzles, it would interrupt the continuous flow of air needed to distribute the mist correctly.

U.S. Pat. No. 4,821,958 issued to Shaffer discloses a mobile pressure cleaning unit. Shaffer has a selection means which communicates sequentially with additive tanks and a known repeating sequence and with the mixing means for solution makeup. Liquid is drawn from a water source and one of the additive tanks with a main pump unloader, pressure sensitive valve communicating with the main pump output wherein the pressure sensitive valve causes the main pump to reticulate the liquid to the main pump input where the output pressure of the main pump exceeds a known value. A pressure sensing means forms an intrical portion of the unloader valve wherein a pressure change in the output to the main pump causes the selection means to advance to the next position in the sequence. Shaffer application utilizes a pressure switch rather than a flow switch to detect the opening and closing of the applicator's on/off valve. The applicator is then capable of sequentially cycling a selector valve to a desired additive by opening and closing of the on/off valve. The applicant's device is not directed to a switching mechanism.

U.S. Pat. No. 3,612,356 issued to McVey discloses an apparatus for spraying turf. The control system on McVey is directed to controlling the rate of flow from five different vented containers. McVey describes each container as containing matter such as turf fertilizer, weed control, fungus control, crabgrass control, and root zone control. The operator sets calibrated dials to a preselected number which in accordance with the amount of liquid chemicals to be applied to a particular lawn. The Applicant's device is limited to a pressure washing device and the controls provide a level of operator's safety by keeping an individual outside the confines of a low pressure system. Unlike McVey, the Applicant's invention operates at high pressure and is capable of delivering pressurized water to items despite their elevation.

U.S. Pat. No. 3,831,849 issued to Studinger discloses a mobile self contained pressure sprayer. Applicant has improved upon the Studinger device by making a mobile self contained pressure with numerous improvements making it safe for not only the operators of the device, but also people in the immediate vicinity. The Studinger skid mounted sprayer is exposed to the elements wherein its chemicals and rotatable pumps can all be accessed by the curious such as children. The Applicant invention is fully enclosed mobile sprayer having a unique chemical injection system.

Thus, what is needed in the art is a mobile pressure washer capable of operating at high pressures with all pumps and chemicals placed within an enclosure that can be made mobile or placed stationary providing for the safety of the operator and surrounding personnel, and for providing continuous pressures despite the incoming water pressures.

SUMMARY OF THE INVENTION

Among the several aspects and features of the present invention may be noted the provision of a totally enclosed, and thus securable, mobile pressure spraying apparatus. The teaching of the instant invention allows for an enclosure that is compartmentalized such that it is partitioned into multiple separate portions providing safety to an operator while working within the trailer. The forward most portion houses the engine and pump assembly. The middle region houses the various fluid tanks and the control valves for the cleaning apparatus. The rearward third compartment is for storage of miscellaneous items, such as hoses, tool boxes, and extra spray guns. Running fully lengthwise and widthwise above these three compartments is a rack for housing of the various ladders and lift mechanisms necessary for a typical building cleaning job.

Water pressure is generated by a piston-type positive displacement pump. The engine driving the pump is diesel powered which minimizes fuel related vapor hazards typical of gasoline powered engines. The engine drives the pump through a belt-pulley arrangement positioned on a two-tiered floor secured skid that allows height adjustment. In addition, the pump unit design allows for repair or replacement of the assembly separate from the enclosure.

The pumping system may include a sealed or open low pressure holding tanks allowing a higher volume of incoming water by elimination of back pressure. The holding tank also allows for the return of unused pressurized water to accommodate the positive displacement pump. This eliminates water waste typical of overflow from open tanks.

The system employs gate valve assemblies allowing a variety of pressure controls including the ability to choose between chemical dispensing and high pressure water spraying. Chemical injection system eliminates the need for open storage containers and manually mixing thus eliminated the risk of chemical exposure from mixing in open tanks.

The enclosed mobile pressure sprayer apparatus of the instant invention comprises a mobile trailer having four outer walls a roof and a floor. The walls include at least one-door for access to an internal area of the trailer which is divided into at least two sections, namely a pump section and a storage section. An inlet valve is secured to an outer wall of the trailer and is for coupling to a low pressure water source, a backflow preventer prevents water from returning back into the source. A first selection valve is secured to an outer wall of the trailer and fluidly coupled to an outlet of the backflow preventer. The valve is selectable between the raw water source and a raw chemical source such as concentrated detergent or chlorine. The use of concentrated chemicals eliminate the need for a separate mixing tank.

A second selection valve is also secured to the outer wall of the trailer and fluidly coupled to the water source and raw chemical source and selectable there between. A storage tank is then coupled to an output of the second selection valve providing a mixing chamber before a pressure pump. A high pressure displacement pump is coupled to the storage tank and followed by a another selection valve also secured to an outer wall of the trailer. The valve is selectable between the storage tank and the pump provided both unpressurized as well as pressurized fluid. A regulatory valve is secured to an outer wall of the trailer and y coupled to the third section valve for controlling the pressure of fluid from the pump and providing a selective return of fluid to the storage tank. A conventional sprayer wand controls fluid output.

Thus, an objective of the instant invention is to provide a mobile enclosed pressure sprayer having a unique chemical injection system that allows for chemical injection by use of low pressure chemical injection pumps with all controls mounted external to the enclosed equipment area.

Another objective of the instant invention is to provide a mobile enclosed pressure sprayer having all chemicals, pumps, and related cleaning equipment placed within a lockable enclosure. The pumps are operated with external controls to reduce theft and vandalism while increasing operator safety.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

IN THE BRIEF DESCRIPTION OF THE DRAWINGS

FIG. 1 is a pictorial side view of the wheeled trailer used in the instant invention;

FIG. 2 is a pictorial side view of the opposite side of the wheeled trailer of FIG. 1;

FIG. 3 is a pictorial front end view of the wheeled trailer of FIG. 1;

FIG. 4 is a pictorial rear end view of the wheeled trailer of FIG. 1;

FIG. 5 is a view of the pump and engine apparatus in conjunction with the detergent supply tank and holding tank of the instant invention;

FIG. 6 is a schematic flow diagram of the valve-line control assembly of the instant invention; and FIG. 7 is a schematic flow diagram of an alternative embodiment of FIG. 6.

DETAILED DESCRIPTION OF THE PREFERRED EMBODIMENT

Although the invention will be described in terms of a specific embodiment, it will be readily apparent to those skilled in this art that various modifications, rearrangements and substitutions can be made without departing from the spirit of the invention. The scope of the invention is defined by the claims appended hereto.

Referring now to the drawings, the mobile housing of the present invention is generally indicated by numeral 10 and consists of a passenger side wall 16, a forward wall 12, a rearward wall 14, a roof 24, an expanded metal floor 28 and a driver side wall, not shown. The floor 28 is constructed from a metal grate to allow for ventilation and heat dissipation and provides a base for support of opposing axles having wheels 30 located on each end of the floor 28. The ladder storage rack 32 is accessed by forward ladder rack flap 34 and a rearward ladder flap 36, each shown in a semi-open position. The exhaust pipe 41 protrudes from the roof 24 through an exhaust aperture 26. A standard trailer hitch 106 is coupled to the front of the base for coupling to a vehicle for transporting. A ladder rack storage apparatus 32 is provided along the length of the housing 10.

Within the passenger side wall 16, a passenger side door is provided, allowing access to the interior of the housing 10. A plurality of water couplings 60 are located along the passenger side wall 16. The couplings 60 permit installment of multiple residential type water hoses to provide the necessary volume of water for a particular situation. The water induction can be used to fill a sealed or open internal water storage tank, or can be directly injected into an ongoing cleaning operation. Also disposed along the passenger side wall are a plurality of outlet valves 98 enabling the coupling of a conventional nozzle wand (not shown) to enable the user to access the solution without entering the housing. A control panel 100 placed along the passenger side wall 16, provides flow control and variation of the detergent mixture amount while standing outside of the housing 10. Security gate 108, installed alongside the control panel 100, secures entry into the housing 10 and also preventing unauthorized activation and use of the control panel 100 while in operation or storage.

Side wall 18 of the housing 10 is detailed in FIG. 2, having side door 20 allowing user access to the chemical and fuel partitions of the housing 10. Also disposed along side wall 18 is a grated air duct 22 which allows the intake of air for use by the interior diesel engine (not shown). It should be noted that all external controls are located on one side of the passenger side of the enclosure for protection of operating personnel when the enclosure is parked along a curb. This prevents the operator from working in the street.

Referring now to FIG. 3, what is shown is a frontal view of the housing 10 of the instant invention. From this side of the housing 10, the user can attach the trailer hitch 106 to the choice of a truck or automobile. Further, the user can access the ladders necessary for a cleaning job by opening frontal ladder rack flap 34 and removing the necessary ladders.

The rearward view of the housing 10 of the instant invention is detailed in FIG. 4. Here is shown the rearward wall composed of two hinged rearward doors or ramp doors 104 open to allow the user uninhibited access to the storage partition of the housing 10. Rearward ladder rack flap 36 enables the user to access the ladders enclosed within the interior of the housing.

Detailed in FIG. 5 is the pump and tank arrangement of the instant invention located within the housing 10. The pump 38 of the instant invention is a high pressure positive displacement piston pump. Any existing pressure pump can be installed but it is recommended that the pump is sized for the specific unit. The pump 38 is driven by a diesel engine 40 by means of a belt and pulley arrangement 42. The pump 38 and diesel engine 40 are each mounted upon a removable skid 44 situated upon the floor 28 of the housing 10. The skid is composed of a first support beam member 50 and a second support beam member 52 running parallel to one another. The pump 38 rests upon a support plate 54. The pump 38 and support plate 54 are each threadably engaged to support beam members 50 and 52 by a plurality of support bolts 56 which are normally disposed to said support beam members 50 and 52. A plurality of nuts (not shown), threadably engaged to the support bolts 56 to plate 50. As these nuts are adjusted upward or downward along the bolts 56, the support plate 54 is thereby adjustably heightened and lowered. This height adjustability of the support plate 54 enables tension adjustment of the belts of the belt and pulley arrangement 42, thereby allowing natural wear of the drive belts, yet provide ease of engine removal for service or ease of replacement. The exhaust 41 of the diesel engine 40 runs upwardly and exits the roof 24 through exhaust aperture 26. Pump outlet 48 allows the pressurized discharge of the desired spray mixture for use in a cleaning job. Pump inlet 46 allows intake of the desired spray mixture from the holding tank 58 of the instant invention.

Referring now to FIG. 6, what is shown is a regulatory valve-line system which responds to the actions taken by the user upon control panel 100. In the system, water is introduced through water supply valve 60. First one way gate valve 64 allows the user to allow or suppress the introduction of water into the system. First check valve 66 prevents fluid introduced into the system from flowing backwards. First three way gate valve 68 gives the user the choice between the introduction of pure water or a water and detergent mixture into the system. Detergent is introduced into the system from detergent supply source represented by numeral 62, and once introduced is prevented from backflow by means of second check valve 72. Detergent injector 70 enables active injection of detergent into the system when desired. Second three way gate valve 74, similar to the first three way gate valve 68 enables, in this instance, the user to choose between a water detergent solution or a pure introduction of detergent into the system. The desired mixture from the immediately foregoing flows into sealed holding tank 58, and is then drawn into pump 38. Third three way gate valve 78 offers yet another opportunity for the user to control the concentration of the detergent water solution or to allow only pure water or pure detergent to be emitted from the sprayer apparatus. Detergent outlet valve 88 is enabled by third one way gate valve 84, which serves to allow or suppress the emission of detergent. Pressure relief valve 80 allows the backflow and reintroduction of any excess fluid which may find its way through the system to third one way gate valve 84, thereby preventing damage to the plumbing within the system. Water outlet valve 86 is enabled by second one way gate valve 82, which allows or suppresses the emission of fluid from this line. Regulating unloader 76 allows a choice of fluid back flow to the holding tank 58 or discharge entirely from the system of the desired amount of fluid.

Referring now to FIG. 7, shown is an alternative embodiment of the plumbing system disclosed in FIG. 6. Downstream of the holding tank 58, this embodiment is identical to that shown in FIG. 6. However, in this embodiment, the third one way gate valve 96 enables discharge from the system entirely of fluid emitted through water outlet valve 86. Second one way gate valve 94 enables detergent outlet valve 88, thereby suppressing or allowing emission of fluid from detergent outlet valve 88. Third three way gate valve 92 offers the user another opportunity to control the concentration of water detergent solution emitted from the system or can enable the user to use a pure water or pure detergent solution to be emitted from the system for a cleaning job. Pressure relief valve 90 provides a means for backflow of excess fluid into the holding tank 58 in the event that such is necessary to prevent damage to the plumbing of the system.

While any type of plumbing might be used to construct this device, the preferred embodiment is comprised of chemically resistant materials including, but not limited to, brass, PVC, polypropylene, and stainless steel. Depending on the type of chemical, more resistant materials should be employed. In the embodied case, the chemical injectors are constructed of 100% PVDF, or Kynar.

The embodied system is also constructed as a closed tank assembly for the inherent advantages thereof. Such advantages include: limiting user exposure to the chemicals, avoiding spillage, and chemical vapors. An open tank system might also be constructed under the present disclosure, but would not carry with it the aforementioned advantages.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and descriptions.

What is claimed is:

1. An enclosed mobile pressure sprayer apparatus comprising:
   a mobile trailer having four outer walls a roof and a floor, said walls including at least one door for access to an internal area of said trailer, said trailer divided into at least two sections defined as a pump section and a storage section;
   an inlet valve secured to an outer wall of said trailer available for coupling to a low pressure water source, said inlet valve including a backflow preventer;
   a first three way selection valve secured to an outer wall of said trailer, said first selection valve having an inlet fluidly coupled to an outlet of said backflow preventer and selectable between a water source line and a raw chemical source line;
   a second three way selection valve secured to an outer wall of said trailer fluidly coupled to said water source line and said raw chemical source line and selectable there between to a common output;
   a storage tank fluidly coupled to said common output of said second selection valve;
   a high pressure displacement pump mounted within said pump section of said trailer having an inlet fluidly coupled to said storage tank;

a third three way selection valve secured to an outer wall of said trailer and fluidly coupled to said pump for directing pressurized fluid to a pressurized outlet or to said storage tank;

a regulatory valve secured to an outer wall of said trailer and fluidly coupled to said pressurized outlet of said third section valve for controlling the pressure of fluid from said pump and providing a selective return of fluid to said storage tank;

a sprayer control coupled to an outlet of said regulatory valve, said sprayer control held by an operator for directing fluid output from said regulatory valve for use in pressure washing.

2. The apparatus according to claim 1, wherein said pump is a high pressure piston-type positive displacement pump coupled to a diesel engine and secured on a height-adjustable skid.

3. The apparatus according to claim 2, wherein said height-adjustable skid is defined as a first support beam member parallely disposed with a second support beam member, each said support beam member resting on said floor means, a support plate of nominal thickness threadably engaged to said support beam members by a plurality of support bolts normally disposed to said support beam members thereby enabling vertical movement of said support plate relative said support bolts, said engine mountably secured to said support beam members, said pump resting on said support plate, said pump threadably engaged to said support bolts, whereby said pump is height adjustable relative said engine thereby enabling tension adjustment of the belts of the conventional belt-pulley.

4. The apparatus according to claim 1 wherein said storage tank is sealed.

5. The apparatus according to claim 4 wherein said sealed storage tank is vented outside the trailer.

6. The apparatus according to claim 1 wherein said raw chemical source line is defined as at least one low pressure chemical injection pump.

7. The apparatus according to claim 1 including a raw water storage tank inserted in a fluid line before said pressurization pump.

* * * * *